June 7, 1949.  J. W. THOMAS  2,472,780
CEREAL GRAIN CRACKING MACHINE
Filed Aug. 27, 1945  3 Sheets-Sheet 1
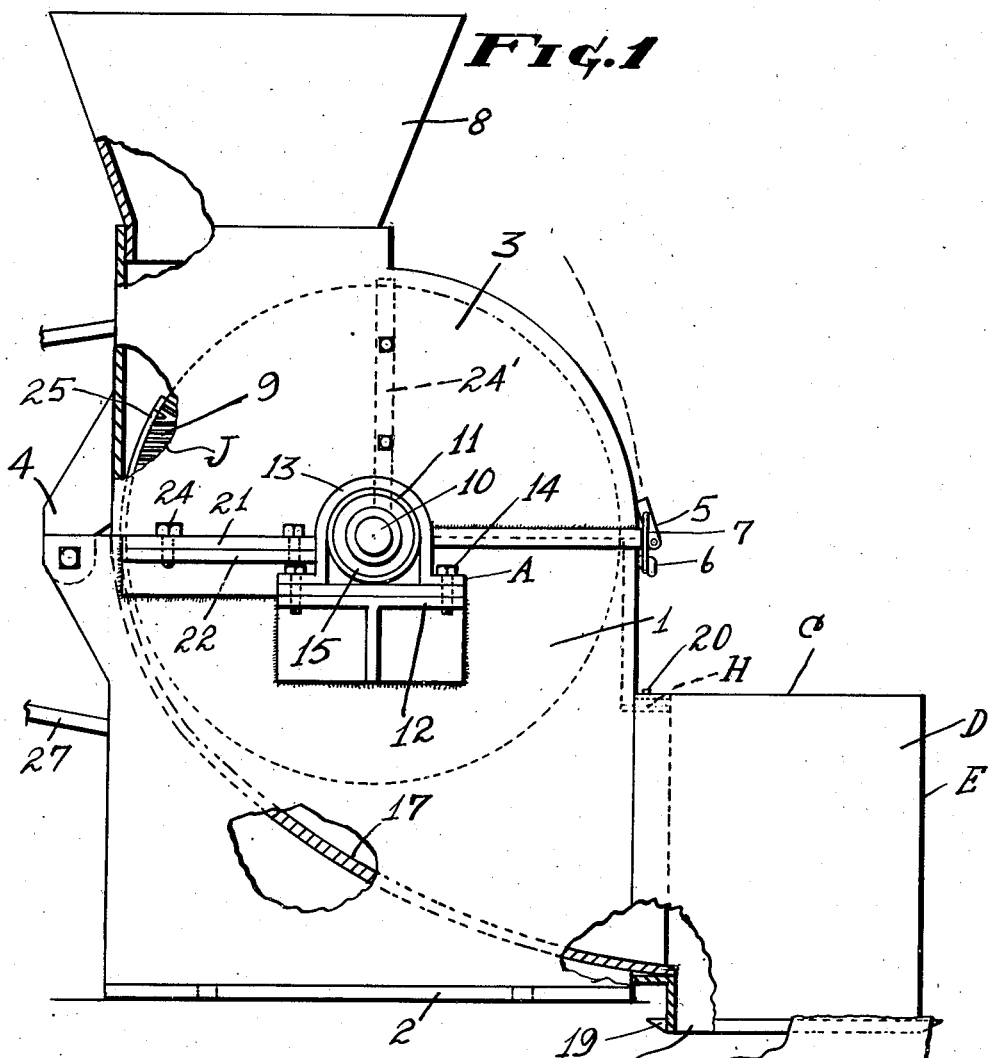
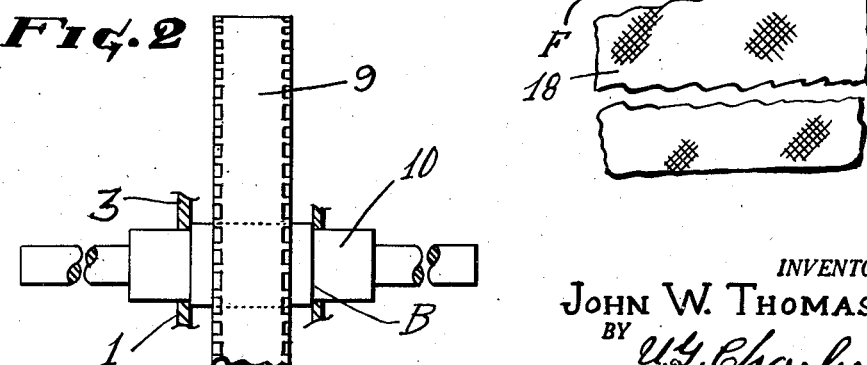
INVENTOR.
JOHN W. THOMAS

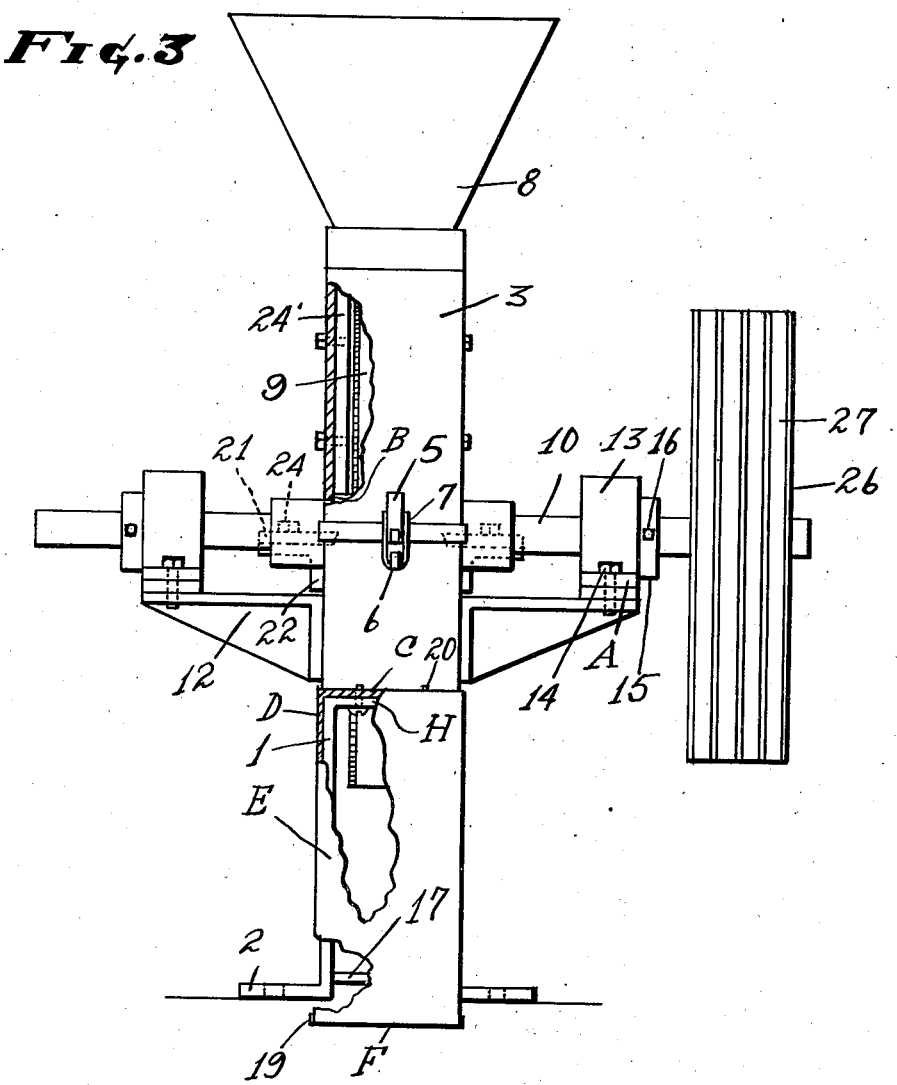

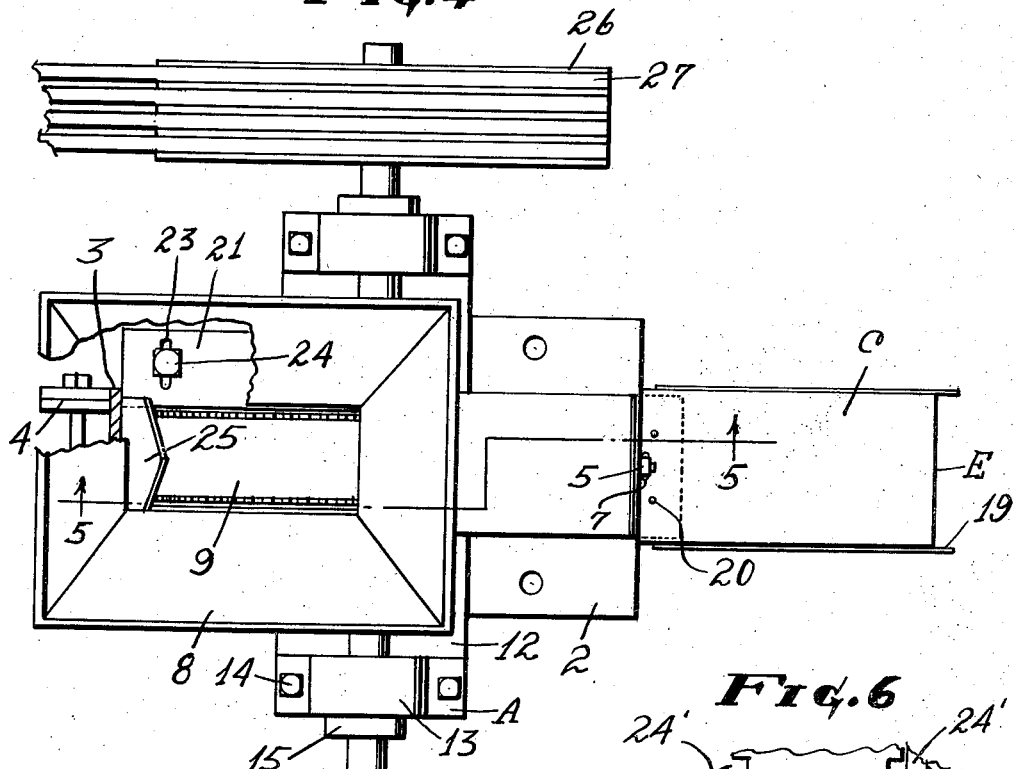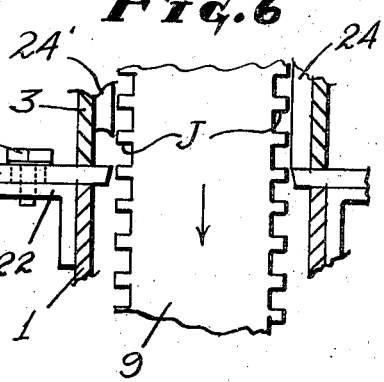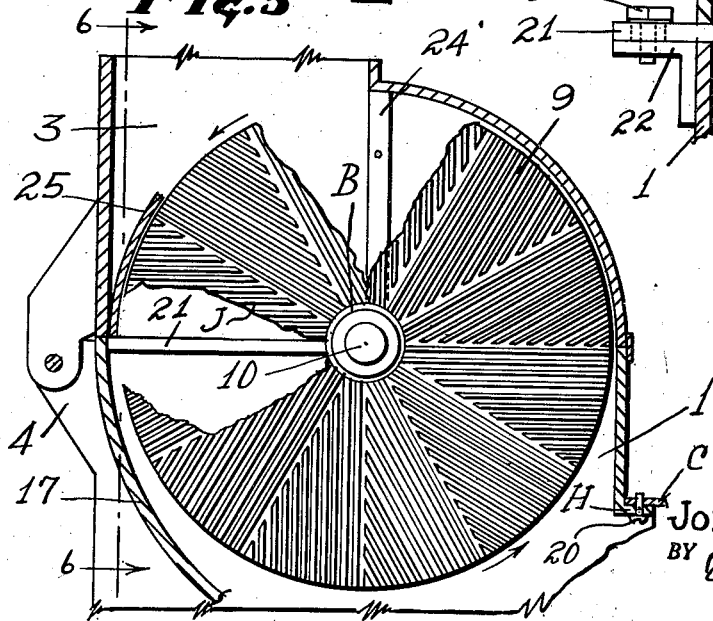

Patented June 7, 1949

2,472,780

UNITED STATES PATENT OFFICE 2,472,780

CEREAL GRAIN CRACKING MACHINE

John W. Thomas, Wichita, Kans., assignor to Thomas, Stone & French, Inc., Wichita, Kans.

Application August 27, 1945, Serial No. 612,771

2 Claims. (Cl. 241—245)

My invention herein disclosed relates to a cereal grain cracking machine, and has for its principal object, means to efficiently crack cereal grain in such a way as to avoid producing flour by restricting a continuous rotation of the cracked grain with the disc rotor.

Another object of my invention is to construct a grain cracking machine, the components of which are few in number, easily manufactured and assembled, and possessed of a high degree of efficiency with respect to its service.

Another object of my invention is to construct a cereal cracking machine that will perform its duty as actuated by a motor minimized with respect to its power capacity, and at the same time capable of producing a selected velocity of R. P. M. for the rotor to crack the grain uniformally at a rapid rate and without producing meal or flour.

These and other objects will hereinafter be more fully explained, reference being had to the accompanying drawings forming a part of this specification, and in which like characters will apply to like parts in the different views.

Referring to the drawings:

Fig. 1 is a side elevation of the machine, parts removed for convenience of illustration.

Fig. 2 is an enlarged fragmentary view of the rotor and its shaft.

Fig. 3 is a front view of Fig. 1, parts removed for convenience of illustration.

Fig. 4 is a plan view of the machine to show the position of a diverting element that extends across the periphery of the rotor.

Fig. 5 is a fragmentary sectional view, taken on line 5—5 in Fig. 4, parts removed for convenience of illustration.

Fig. 6 is an enlarged view of the rotor to illustrate the grooved sides of the rotor and edged blade adjustably secured to the machine casing in working relation to the grooved sides of the rotor.

As a more concise description of the drawings, it will be seen that the structure consists of a casing comprised of side walls 1 having foot elements 2 for each side wall and being turned outwardly from each other to carry the machine, said casing having a hood enclosure 3 that is rockably connected thereto by hinges 4, and being secured in a closed position by a catch at the front of the machine, said catch comprising a block 5 that is secured to the front of the hood enclosure, and a pin 6 secured to and outwardly extending at right angle from the body adjacent its upper extremity and a loop 7 rockably carried by the block and adapted to engage under the pin to lock the hood and casing firmly together while the machine is in action.

Positioned on the hood is a hopper 8 that communicates with the interior of the casing as a guide for grain fed into the machine and being positioned in registry with the rotor at one side of the turning axis.

Rotatably journalled in the casing is a disc rotor 9, said rotor being axially secured to a shaft 10 that is journalled in bearings 11, said bearings being secured to brackets 12 adjacent their outer extremities by U-caps 13, the legs A of which are secured to the brackets by cap screws 14 threadedly engaging in the bracket.

As a means to restrict longitudinal movement of the said shaft is through the medium of collars 15 that are secured to close engagement with the outer ends of said bearings by cap screws 16 threadedly engaging through the shell of the collars to tight engagement with the shaft as shown in Fig. 3.

To prevent cracked grain from passing outward where the shaft engages through the side walls of the casing, it will be seen in Figs. 2 and 3 that shoulders B are formed by reducing the diameter of the shaft where it passes through the side walls of the casing, said shoulders being in close contact with the inner side of their respective side walls.

It will be seen that the sides of the casing are spaced outward from the sides of the rotor whereby ample room is provided to function as a receiving chamber for the grain as cracked. The said chamber is provided with a bottom 17 slanting downwardly and outwardly on an arc toward the front of the casing where said chamber joins a chute comprised of a top C, sides D and a front E while the rear is open to communicate with said chamber and likewise the lower extremity as at F is open to function as a discharge for cracked grain into sacks 18 or the like, or may be conducted to a place of storage through a suitable pipe system, the latter not shown in the drawings but in such event a blower may be provided to force the cracked grain outward, said blower as well as the pipe system being alternates and not shown in the drawings.

When sacks as containers for the cracked grain are employed it will be seen that the upper or open end of the sack will engage around the open end of the chute and being secured thereto by suitable hooks 19 secured to the chute structure.

As a matter of course said sacks when filled are removed and secured to a closed position by stitching or otherwise.

The chute above referred to is removably secured to the casing by pins 20 upwardly extending from a flange H that is integral with the casing whereby the chute may be removed for a suitable spout connection and a blast fan to discharge the grain.

It will be understood that the chute as connected in Fig. 1 has an opening at its rear as above stated which will engage over said flange fitting closely thereon and retained at its lower extremity by such engagement and by gravity strain from sacks as they are filled.

The method of cracking the grain is accomplished by blades 21 adjustably secured to the sides of the casing on a plane with the turning axis of the shaft, said blades being carried by horizontally disposed bars 22 that are secured to the casing sides. To move the blades toward and from the rotor sides, it will be seen that elongated slots 23 are provided in the blades through which bolts 24 will extend and threadedly engaging in said bars whereby the edges of the blades are moved toward and from the sides of the rotor to crack the grain to a desired comminution.

It will be understood that the aforedescribed blades and bars are rigidly carried by the body portion of the casing at its upper extremity at which point the hood will seat grain tight and being secured as heretofore described.

Both sides of the rotor are subdivided into grooved sections arranged to abutting engagement and each section plurally grooved, the first groove of each section being aligned radially with the turning axis of the rotor, while the other grooves are in parallelism therewith and terminating in their consecutive order along the radial groove of next succeeding section whereby the trailing wall J of the first groove will contact the cutting edge of the blade its entire length simultaneously while the other grooves will increase their angle consecutively as the rotor turns, and so on through the sections of each side. The trend of the tangentially engaging grooves is to throw the grain as cracked toward the said turning axis and furthermore a shearing contact is had with the edge of the blade except for the first said groove of each section.

The foregoing description is in the language of grooves while in reality the cracking is done by the trailing side wall of each groove at its outer extremity, in other words, each groove is channel-like in cross section and the comminutions of the grain is carried within the channel as it passes the cutting edge of the blade. At the same time if the comminutions are not cracked sufficient to enter the grooves such particles will rebound for repeated strokes cracking the same sufficient to enter the groove and the particles of grain being so conducted and cracked have proven to accomplish the final result without producing flour or meal for the reason that the cracking mechanism is void of parallel confronting surfaces in contact with each other to rub or pulverize the particles while passing through the machine.

As a means to restrict the flow of the grain to the leading side of the rotor's rotation it will be seen that the length of the throat of the hopper is equal to the radii of the rotor from the turning axis to its circumference as shown in Figs. 4 and 5, and to restrict the grain as it leaves the throat from moving against the rotation there is provided bars 24' rectangular in cross section that are secured to their respective inside walls of the hood and being in alignment with the end of the hopper that is radially disposed with the turning axis of the rotor and the thickness of each bar being equal to or slightly lesser than the space between the sides of the rotor and inner sides of the hood.

To avoid pulverizing tendency of the grain circumferentially of the rotor there is provided an arcuate plate 25, the lower end of which is secured to the hood at its lower extremity, while its edges are secured to the sides of the hood, the plate being arced sufficient to closely engage on the periphery of the rotor to function as a stop for the grain which otherwise may be pulverized at the periphery of the rotor, said plate at its upper end being pitched each way from the center zone of the rotor's periphery to assist the grain moving to each side upward from the horizontal plane of its turning axis. Inasmuch as the hood is rockably carried on the casing by its said hinges, the same may be inverted to empty any accumulation of grain between the upper end of the plate and wall of the hopper when the machine is idle.

As actuating means for the machine there is provided a plurally grooved pulley 26 secured to the drive shaft as turning means therefor, said pulley to receive belt members 27 engaging in the grooves and in a similar grooved pulley of a suitable diameter that is secured to the drive shaft of a motor.

While the structure of the machine is specifically set forth the same may be varied as lie within the scope of the appended claims.

Having fully described my invention what I claim as new and desire to secure by Letters Patent is:

1. In a machine of the class described for cracking grain, a casing comprising a hood hingedly connected to the casing and a hopper positioned on the hood, and a hollow portion to carry the casing, said hopper to receive grain and discharge the same into the casing and a bottom for the hollow portion, said bottom slanting downwardly and outwardly from the hollow portion to function as a discharge for the grain from the casing, a disc rotor having a smooth periphery and grooved sides, said disc rotor having a shaft and being journalled in the casing, elongated cutting blades adjustably carried by the casing and extending outward in the same direction from the turning axis of the rotor and being on a horizontal plane therewith and the cutting edges of the blades extending in and toward their respective grooved sides of the rotor, and bars vertically secured to the hood side walls inwardly thereof, said bars extending from the shaft to the casing thereabove to close the space between the walls and sides of the rotor to restrict the flow of grain to the approaching movement of the rotor and to avoid continuous rotation of the grain with the rotor while cracking the grain.

2. In a machine as recited in claim 1, each grooved side of the disc rotor being subdivided into sections, said grooves being channel-like in cross section and the first groove of each section being radially disposed with the turning axis of the disc rotor, while the other grooves of said section are in parallelism with the first said radial groove and terminating their inner ends with the radial groove of a succeeding section to produce a shearing contact with the edge of the cutting blades.

JOHN W. THOMAS.

(References on following page)

REFERENCES CITED

The following references are of record in the file of this patent:

UNITED STATES PATENTS

| Number | Name | Date |
|---|---|---|
| 349,693 | Clark | Sept. 28, 1886 |
| 425,817 | McCanna et al. | Apr. 15, 1890 |
| 678,983 | Sackett | July 23, 1901 |
| 790,619 | Clough | May 23, 1905 |
| 1,333,198 | Arzinger | Mar. 9, 1920 |
| 1,632,341 | Koch | June 14, 1927 |
| 1,725,743 | Anderson | Aug. 27, 1929 |
| 1,839,532 | Calhoun | Jan. 5, 1932 |
| 1,973,169 | Ielfield | Sept. 11, 1934 |
| 2,241,667 | Mankoff | May 13, 1941 |